United States Patent
Wang

(10) Patent No.: US 7,755,724 B2
(45) Date of Patent: Jul. 13, 2010

(54) DISPLAY APPARATUS

(75) Inventor: Chih-Haw Wang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 171 days.

(21) Appl. No.: 12/014,808

(22) Filed: Jan. 16, 2008

(65) Prior Publication Data

US 2009/0021672 A1 Jan. 22, 2009

(30) Foreign Application Priority Data

Jul. 20, 2007 (TW) .............................. 96126597 A

(51) Int. Cl.
*G02F 1/1335* (2006.01)

(52) U.S. Cl. .......................... 349/114; 349/96; 349/117

(58) Field of Classification Search ........................ None
See application file for complete search history.

(56) References Cited

U.S. PATENT DOCUMENTS

| 5,973,760 | A | 10/1999 | Dehmlow |
| 6,407,726 | B1 | 6/2002 | Endo et al. |
| 6,710,831 | B1 | 3/2004 | Winker et al. |
| 6,801,263 | B2 | 10/2004 | Sato et al. |
| 6,832,836 | B2 | 12/2004 | Yatsu et al. |
| 6,945,651 | B2 | 9/2005 | Yatsu et al. |
| 2004/0004687 | A1 | 1/2004 | Baek |
| 2005/0275779 | A1 | 12/2005 | Nanno |
| 2006/0209239 | A1* | 9/2006 | Lin .............................. 349/119 |
| 2008/0030655 | A1* | 2/2008 | Sugiyama et al. .............. 349/96 |

FOREIGN PATENT DOCUMENTS

| CN | 1379252 | 11/2002 |
| CN | 1437053 | 8/2003 |
| CN | 1619369 | 5/2005 |
| JP | 55048734 | 4/1980 |
| JP | 10293330 | 11/1998 |

* cited by examiner

*Primary Examiner*—Tina M Wong
(74) *Attorney, Agent, or Firm*—Jianq Chyun IP Office

(57) ABSTRACT

A display apparatus is provided. The display apparatus is suitable for a user to view through a polarization component having a first transmittance axis. The display apparatus includes a display module, a polarizer and a biaxial half-wave plate. The polarizer has a second transmittance axis such that a light provided from the display module passes through the polarizer and is converted into a polarized light. The biaxial half-wave plate is disposed on the display module and between the polarizer and the polarization component. The biaxial half-wave plate has a slow axis arranged between the first and second transmittance axes. The polarization of the polarized light passing through the biaxial half-wave plate tends toward the first transmittance axis.

14 Claims, 12 Drawing Sheets

DISPLAY APPARATUS

CROSS-REFERENCE TO RELATED APPLICATION

This application claims the priority benefit of Taiwan application serial no. 96126597, filed on Jul. 20, 2007. The entirety of the above-mentioned patent application is hereby incorporated by reference herein and made a part of this specification.

BACKGROUND OF THE INVENTION

1. Field of the Invention

The present invention is related to a display apparatus, and more particularly, to a display apparatus capable of being viewed through a polarization component by users.

2. Description of Related Art

Since liquid crystal displays (LCDs) are not self-illuminating, an external light source is required for providing the LCD panels with enough brightness. LCDs can be classified into three types by different light sources, which are transmissive LCDs, transflective LCDs and reflective LCDs. Among them, the transflective LCDs utilizing both a back-light source and an external light source are suitable for being applied to portable products, such as cell phones, personal digital assistants (PDAs) and e-Books. Therefore, the transflective LCDs draw more and more attention from the public.

In a general-purpose LCD, an upper polarizer and a lower polarizer are usually disposed on an external surface of the LCD panel to achieve a display effect. However, when the LCD is applied to a portable product, a user wearing sunglasses usually can not clearly identify images displayed on the LCD due to the polarizers disposed therein.

FIG. 1A is a schematic view illustrating sunglasses and a conventional LCD. Referring to FIG. 1A, an LCD 100 includes a back-light source 110, an upper polarizer 120, a lower polarizer 130 and an LCD panel 140 disposed between the upper polarizer 120 and the lower polarizer 130. As shown in FIG. 1A, a transmittance axis of the upper polarizer 120 extends in a direction D1. Therefore, after passing through the upper polarizer 120, an image displayed on the LCD panel 140 has a polarization D1. When a user wears sunglasses 150 having a transmittance axis extended in a direction D2, the user can only view a portion of the light, which thus causes the brightness visible to the user to be decreased.

FIG. 1B is a coordinate graph depicting the polarization of the image displayed on the LCD in FIG. 1A and the transmittance axis of the sunglasses. In FIG. 1B, the X axis in the coordinate graph is defined as paralleling with a long edge of the LCD 100 and the Y axis in the coordinate graph is defined as paralleling with a short edge of the LCD 100. Referring to FIG. 1B, a component of the displayed image having the polarization D1 can be viewed by the user. The component is parallel to an extending direction D2 of the transmittance axis of the sunglasses 150. Thus, the brightness of the image viewed by the user significantly decreases. In addition, the displayed image having the polarization D1 is a linear polarized light, and thus, the component of the polarization D1 projected on the polarization D2 obviously varies with an included angle between the polarization D1 and the polarization D2. In other words, when the included angle between the transmittance axis of the sunglasses 150 and the polarization D1 is changed, the image viewed by the user obviously varies. Therefore, when the user wearing the sunglasses 150 views the LCD 100, a problem of high dependency on included angle between optical axes exists in the LCD 100 of prior art.

To solve the above-mentioned problem, another conventional technique is provided. FIG. 2A is a schematic view illustrating sunglasses and another conventional LCD. FIG. 2B is a coordinate graph depicting the polarization of an image displayed on the LCD in FIG. 2A and a transmittance axis of the sunglasses. Referring to FIGS. 2A and 2B, a quarter-wave plate 160 is disposed between the upper polarizer 120 of the LCD 100 and the sunglasses 150. When the displayed image of the LCD 100 passes through the quarter-wave plate 160, the polarization of the displayed image is converted from a linear polarized light to a circular polarized light. In comparison with the linear polarized light, the component of the circular polarized light is approximately the same in each direction. Thus, the above-mentioned problem of the LCD 100 can be mitigated.

However, the brightness in the scenario where the user wearing the sunglasses views the LCD still can not be effectively enhanced. Therefore, how to solve both the problems of brightness and the dependency on included angle between optical axes will be a key point of the development in the LCD application.

SUMMARY OF THE INVENTION

The present invention provides a display apparatus, which can provide regular display quality when a user views the display apparatus through a polarization component.

The present invention further provides a display apparatus. The display apparatus has a biaxial half-wave plate, by which a polarization of a displayed image can be properly modulated to meet various applications.

As embodied and broadly described herein, a display apparatus is provided. The display apparatus is suitable for a user to view through a polarization component having a first transmittance axis. The display apparatus includes a display module, a polarizer and a biaxial half-wave plate. The polarizer is disposed on the display module, and the polarizer has a second transmittance axis such that a polarized light is provided. The biaxial half-wave plate is disposed on the display module and between the polarizer and the polarization component. The biaxial half-wave plate has a slow axis arranged between the first and second transmittance axes. A polarization of a polarized light passing through the biaxial half-wave plate tends toward the first transmittance axis.

In one embodiment of the present invention, the display module includes a reflective liquid crystal display (LCD) module or a transflective LCD module.

In one embodiment of the present invention, the display module includes a back-light source and an LCD panel disposed on the back-light source. In one embodiment, the display module further includes a viewing angle compensation film or a wide-viewing angle film disposed on the LCD panel. The viewing angle compensation film is, for example, a quarter-wave plate or a combination of a quarter-wave plate and a half-wave plate.

In one embodiment of the present invention, the display module includes a self-illuminating display panel.

In one embodiment of the present invention, the display module has a long edge and a short edge. An included angle between the first transmittance axis and the long edge is $\theta_1$, an included angle between the slow axis and the lone edge is $\theta$, and an included angle between the second transmittance axis and the long edge is $\theta_2$, where $\theta$ is between $\theta_1$ and $\theta_2$. In one embodiment, the angle $\theta_2$ between the second transmittance axis and the long edge is 45°, and the angle $\theta_1$ between the first transmittance axis and the long edge is 90°. In another embodiment, the angle $\theta_2$ between the second transmittance axis and the long edge is 45°, and the angle $\theta_1$ between the first transmittance axis and the long edge is 0°.

In one embodiment of the present invention, the biaxial half-wave plate provides a plate retardation Rth and a planar retardation Ro in a thickness direction of the biaxial half-wave plate. In one embodiment, the planar retardation Ro satisfies a formula: 250 nm≦Ro≦300 nm. In another embodiment, the biaxial half-wave plate has an Nz value satisfying a formula: Nz=Rth/Ro<1.4.

The present invention further provides a display apparatus including a display module, a polarizer and a biaxial half-wave plate. The display module has a long edge and a short edge. The polarizer is disposed on the display module. The polarizer has a transmittance axis, and an included angle $\theta_p$ is formed between the transmittance axis and the long edge such that a polarized light is provided. The biaxial half-wave plate is disposed on the display module and has a slow axis, and an included angle $\theta$ is formed between the slow axis and the long edge. A polarization of the polarized light through the biaxial half-wave plate tends to be parallel to the short edge. The transmittance axis and the slow axis satisfy the following formula: $|\theta_p|<|\theta|<90°$.

The present invention provides another display apparatus including a display module, a polarizer and a biaxial half-wave plate. The polarizer is disposed on the display module and has a transmittance axis such that a polarized light is provided. The biaxial half-wave plate having a slow axis is disposed on the polarizer. An included angle is formed between the transmittance axis and the slow axis is larger than 0° and smaller than 45°, for example.

In one embodiment of the present invention, the included angle between the transmittance axis and the slow axis is about 22.5°.

In one embodiment of the present invention, the display module further includes a viewing angle compensation film or a wide-viewing angle film disposed on the LCD panel.

In one embodiment of the present invention, the viewing angle compensation film includes a quarter-wave plate and a combination of the quarter-wave plate and a half-wave plate.

In one embodiment of the present invention, the display module includes a reflective LCD module or a transflective LCD module.

In the present invention, the polarization of an image on the display module is properly modulated through the biaxial half-wave plate. In one embodiment, in such manner, the polarization of the modulated image tends toward the transmittance axis direction of a polarization component (e.g. sunglass) worn by a user. Therefore, in comparison with the arrangement of the conventional LCDs, the brightness of the LCD in the present invention can be increased, and the dependency on included angle between optical axes can be decreased.

In order to the make the aforementioned and other objects, features and advantages of the present invention more comprehensible, several embodiments accompanied with figures are described in detail below.

DESCRIPTION OF EMBODIMENTS

Figure 3:
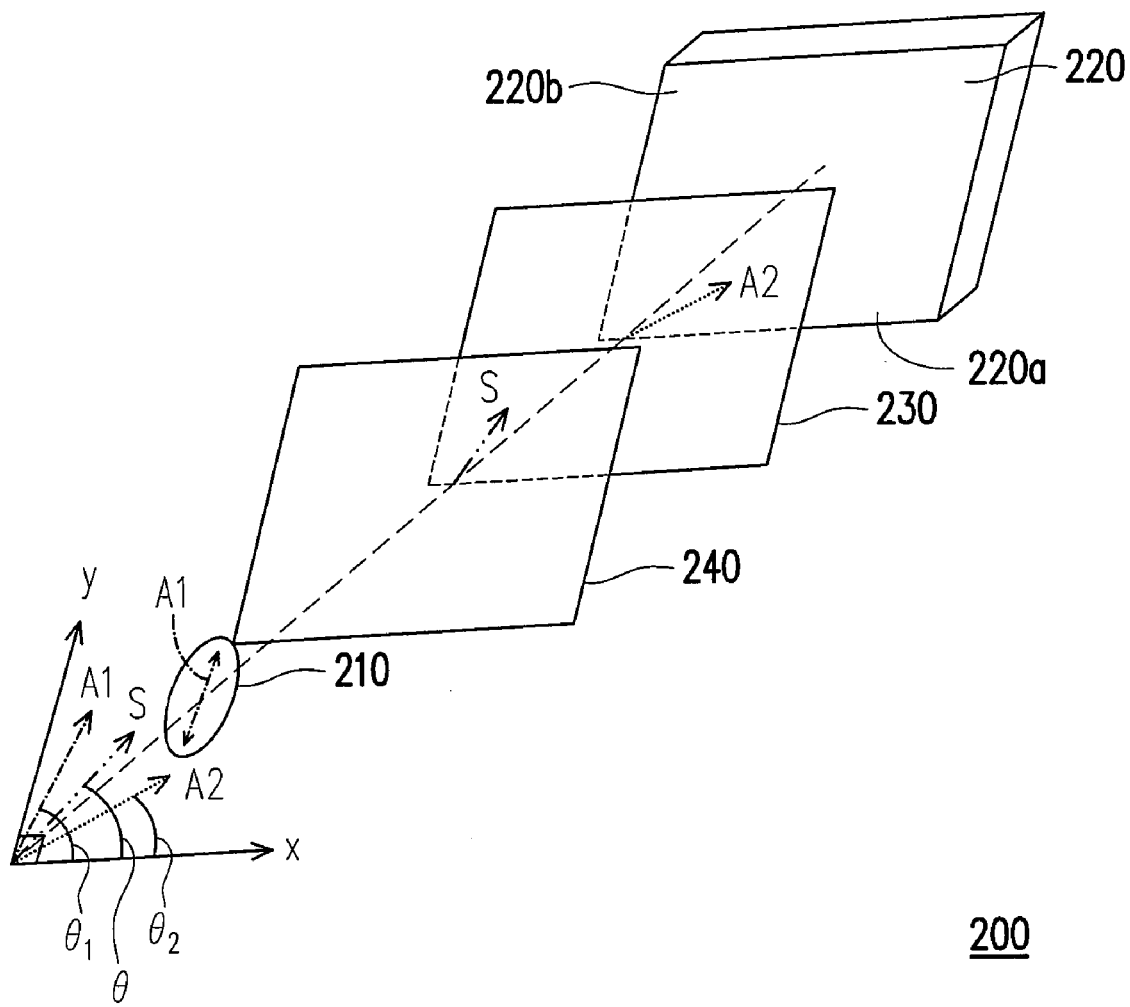
FIG. 3 is a schematic view illustrating a display apparatus of the present invention.

FIG. 3 is a schematic view illustrating a display apparatus according to one embodiment of the present invention. Referring to FIG. 3, a display apparatus 200 of the present embodiment is suitable for a user to view through a polarization component 210 having a first transmittance axis A1. For example, when users are in an outdoor environment or other environments with sufficient illumination, the users wearing sunglasses would be aware that the brightness of a display apparatus is obviously decreased when they use the display apparatus. Meanwhile, the sunglasses worn by the user can be considered as a polarization component 210. The display apparatus 200 of the present embodiment includes a display module 220, a polarizer 230 and a biaxial half-wave plate 240. The polarizer 230 is disposed on the display module 220. The polarizer 230 has a second transmittance axis A2 such that the light from the display module 220 passes through the polarizer 230 and is converted into a polarized light. The biaxial half-wave plate 240 is disposed on the display module 220 and between the polarizer 230 and the polarization component 210. The biaxial half-wave plate 240 has a slow axis S arranged between the first transmittance axis A1 and the second transmittance axis A2. A polarization of the polarized light passing through the biaxial half-wave plate 240 tends to the first transmittance axis A1.

Referring to FIG. 3, the display module 220 has a long edge 220a and a short edge 220b, for example. The X axis in the coordinate graph is defined as paralleling with the long edge 220a of the display module 220, and the Y axis in the coordinate graph is defined as paralleling with the short edge 220b of the display module 220. An included angle formed between the first transmittance axis A1 of the polarization component 210 and the long edge 220a is $\theta_1$, an included angle formed between the slow axis S of the biaxial half-wave plate 240 and the long edge 220a is $\theta$, and an included angle formed between the second transmittance axis A2 of the polarizer 230 and the long edge 220a is $\theta_2$. As shown in FIG. 3, $\theta$ is between $\theta_1$ and $\theta_2$. It should be noted that a polarization of a polarized light can be modulated by the slow axis S between the first transmittance axis A1 and the second transmittance axis A2 so that the polarization of a displayed image of the display module 220 passing through the polarizer 230 tends to the first transmittance axis A1 of the polarization component 210 and can be viewed by the user. Hence, the brightness of the display apparatus 200 in the present embodiment is increased.

Figure 4A:
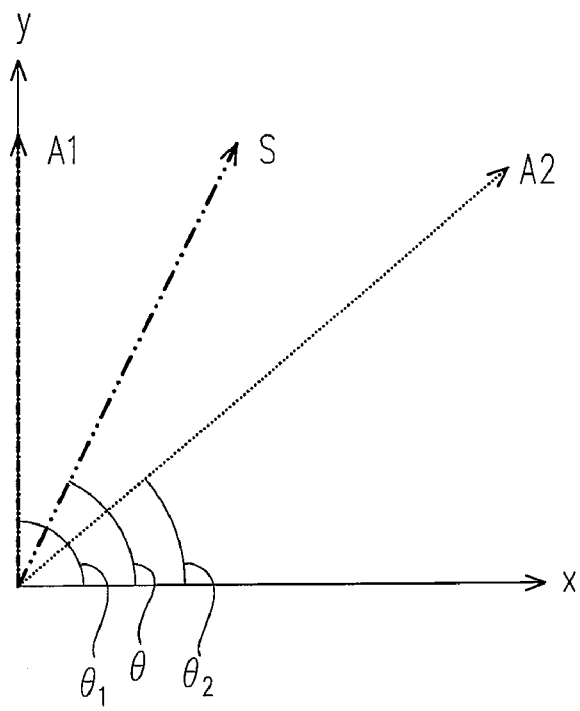
FIG. 4A and FIG. 4B are coordinate graphs depicting the relationship between the first transmittance axis of the polarization component, the second transmittance axis of the polarizer, and the slow axis of the biaxial half-wave plate.
Figure 4B:
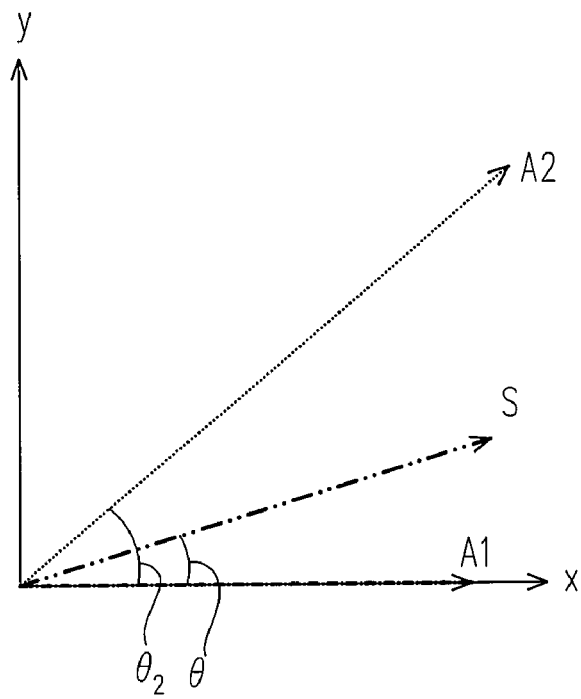

FIG. 4A and FIG. 4B is a coordinate graph depicting the relationship between the first transmittance axis of the polarization component, the second transmittance axis of the polarizer, and the slow axis of the biaxial half-wave plate. Referring to FIG. 4A, generally, the first transmittance axis A1 of the polarization component 210 is substantially vertical to the long edge 220a of the display module 220, that is, $\theta_1$ is about 90°. The angle $\theta_2$ between the second transmittance axis A2 of the polarizer 230 and the long edge 220a is about 45°. In this case, the slow axis S between the first transmittance axis A1 and the second transmittance axis A2 has a function of modulating the polarization of the polarized light. Therefore, the brightness of the display apparatus 200 in the present embodiment would not be obviously decreased. In an alternative embodiment, to meet the design requirements for different applications, the included angle $\theta_1$ between the polarization component 210 and the long edge 220a of the display module 220 is not limited in the present invention. For example, when the user places the display module 220 vertically and views through the same polarization component 210, the coordinate graph of the display apparatus is shown as FIG. 4B. The first transmittance axis A1 is parallel to the long edge 220a of the display module 220, that is, $\theta_1$ is about 0°. Similarly, the slow axis S arranged between the first transmittance axis A1 and the second transmittance axis A2 has a function of modulating the polarization of an image displayed on the display module.

Figure 1A:
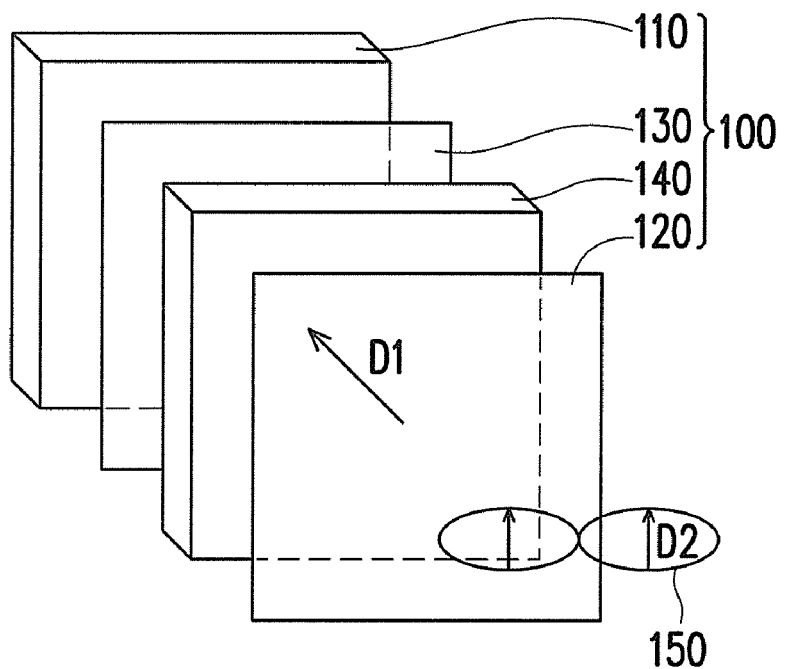
FIG. 1A is a schematic view illustrating sunglasses and a conventional liquid crystal display (LCD).
Figure 1B:
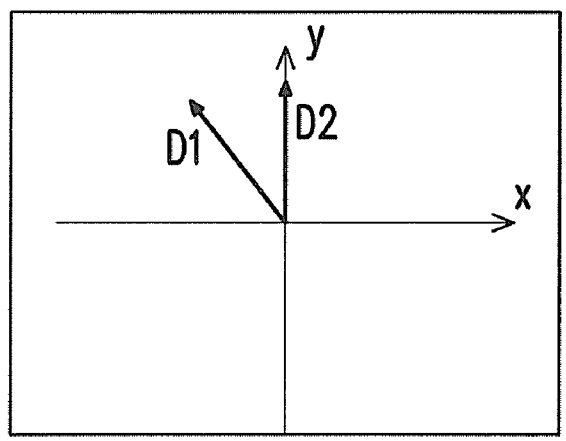
FIG. 1B is a coordinate graph depicting a polarization of an image displayed on the LCD in FIG. 1A and a transmittance axis of the sunglasses.
Figure 2A:
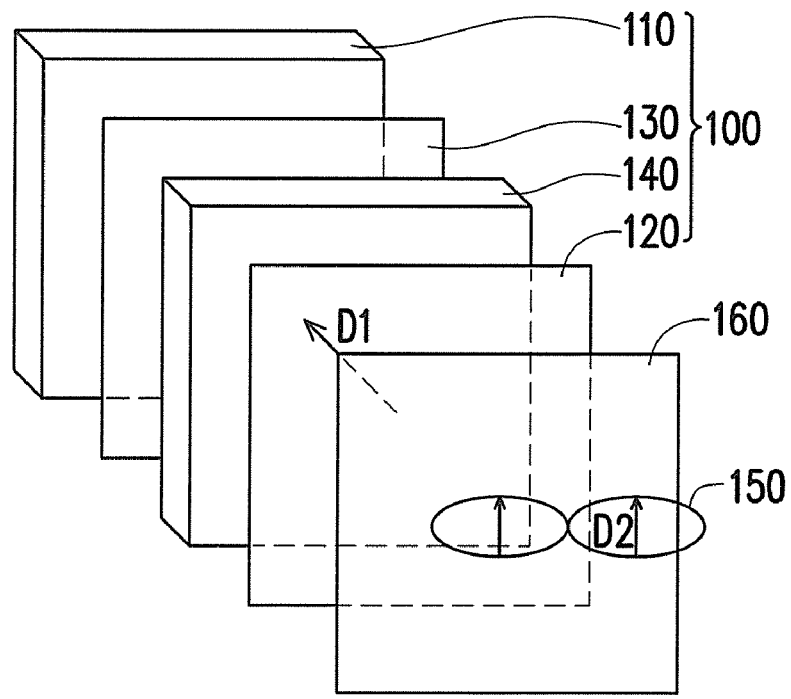
FIG. 2A is a schematic view illustrating sunglasses and another conventional LCD.
Figure 2B:
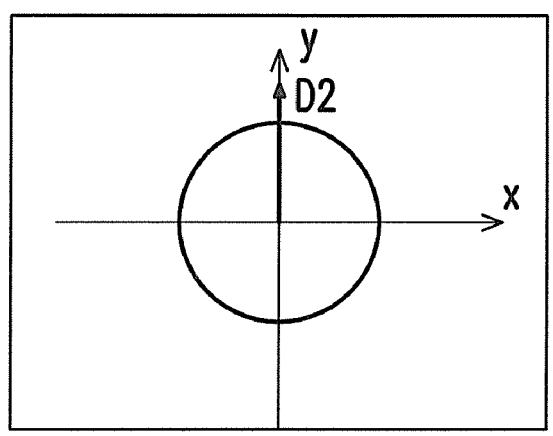
FIG. 2B is a coordinate graph depicting a polarization of an image displayed on the LCD in FIG. 2A and the transmittance axis of the sunglasses.
Figure 5A:
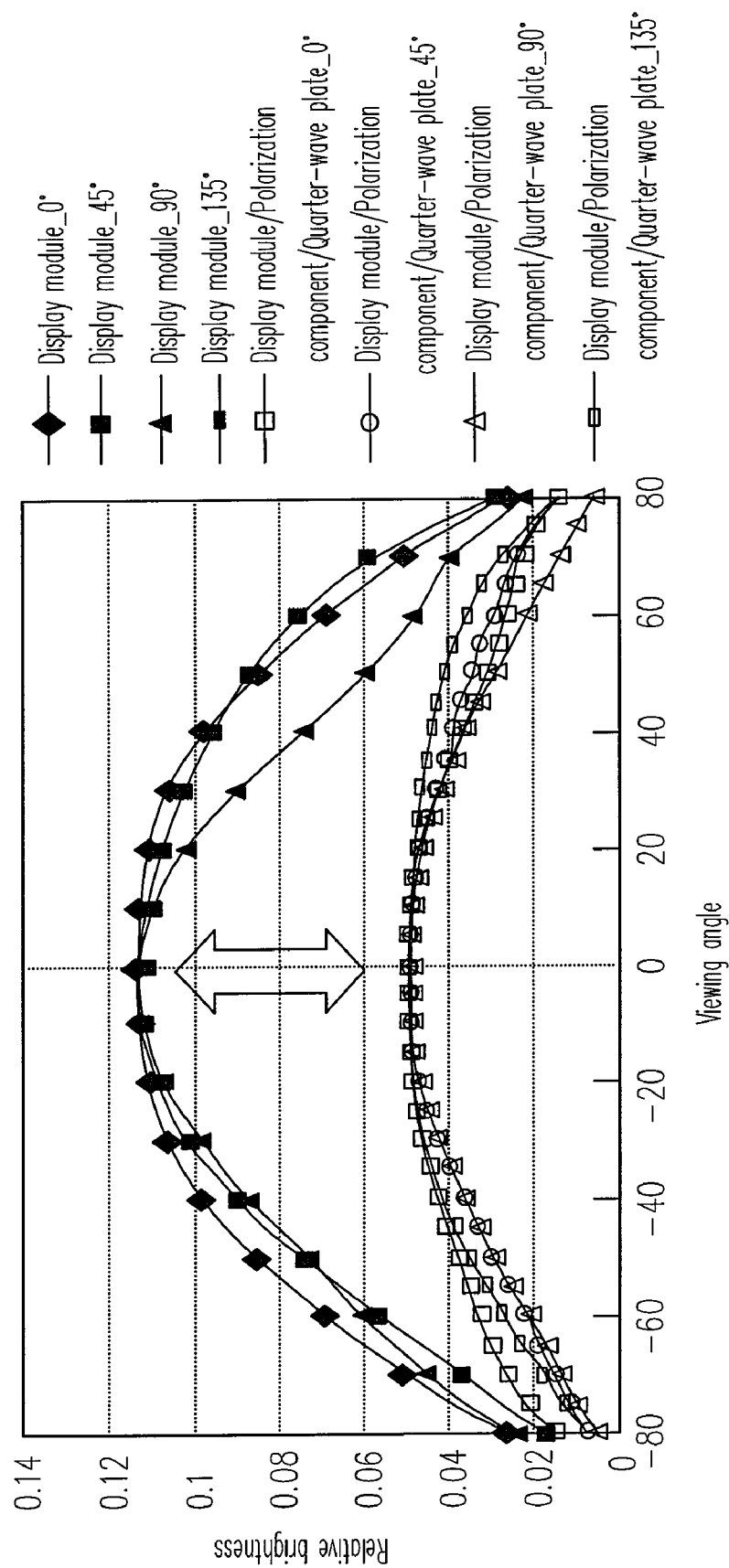
FIG. 5A and FIG. 5C illustrate the brightness of a conventional display apparatus viewed through the polarization component from various horizontal viewing angles.
Figure 5B:
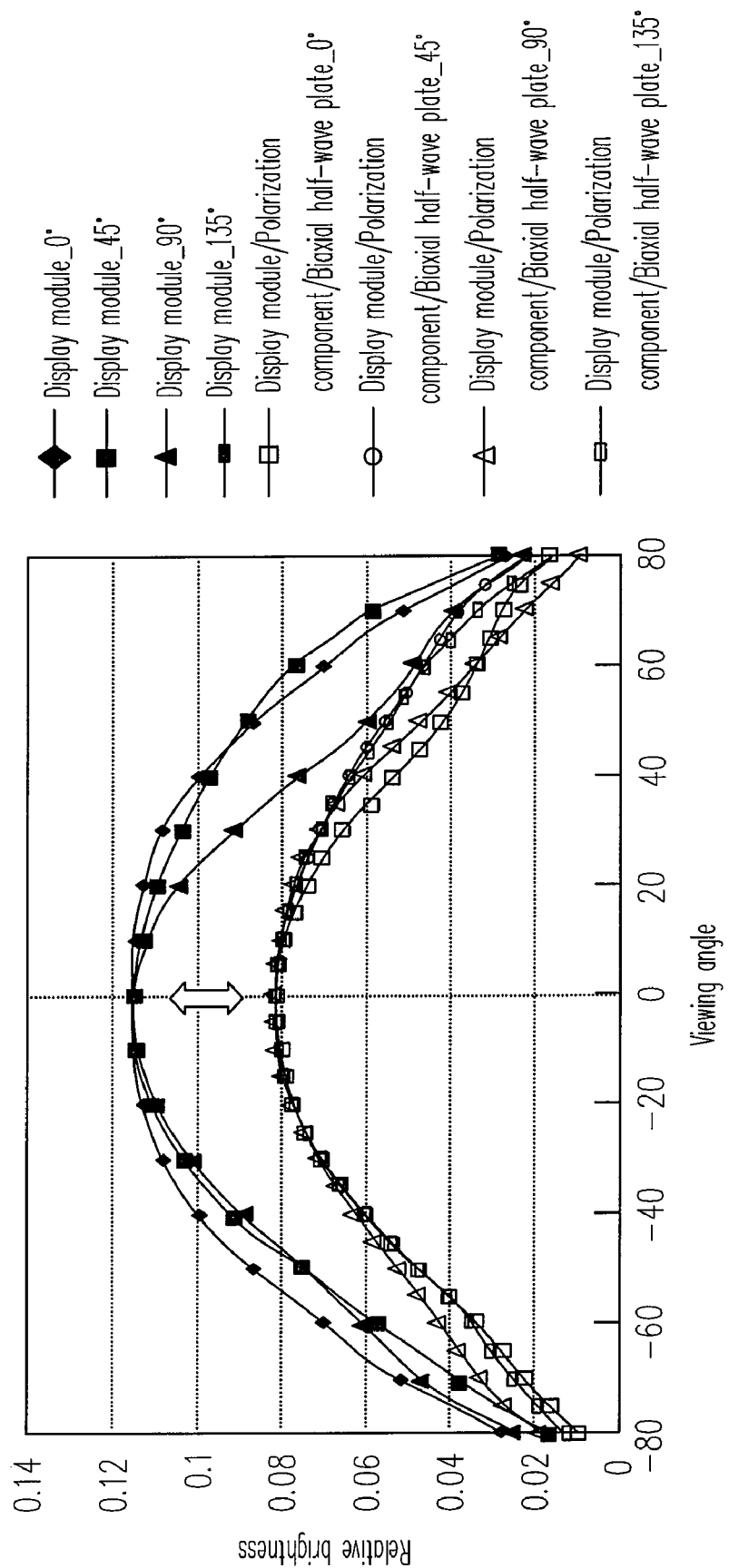
FIG. 5B and FIG. 5D illustrate the brightness of a display apparatus of the present invention viewed through the polarization component with various horizontal viewing angles.
Figure 5C:
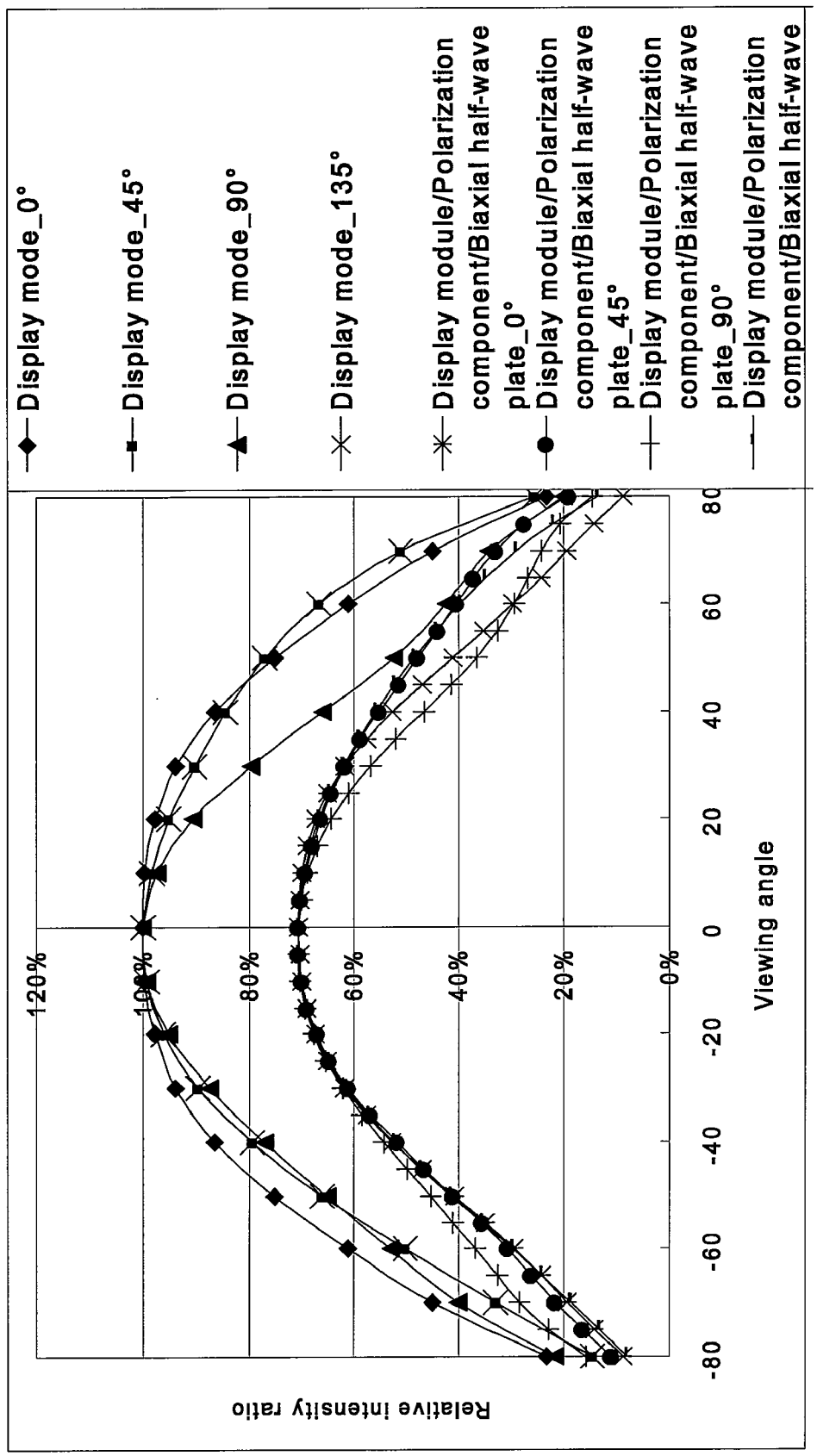
Figure 5D:
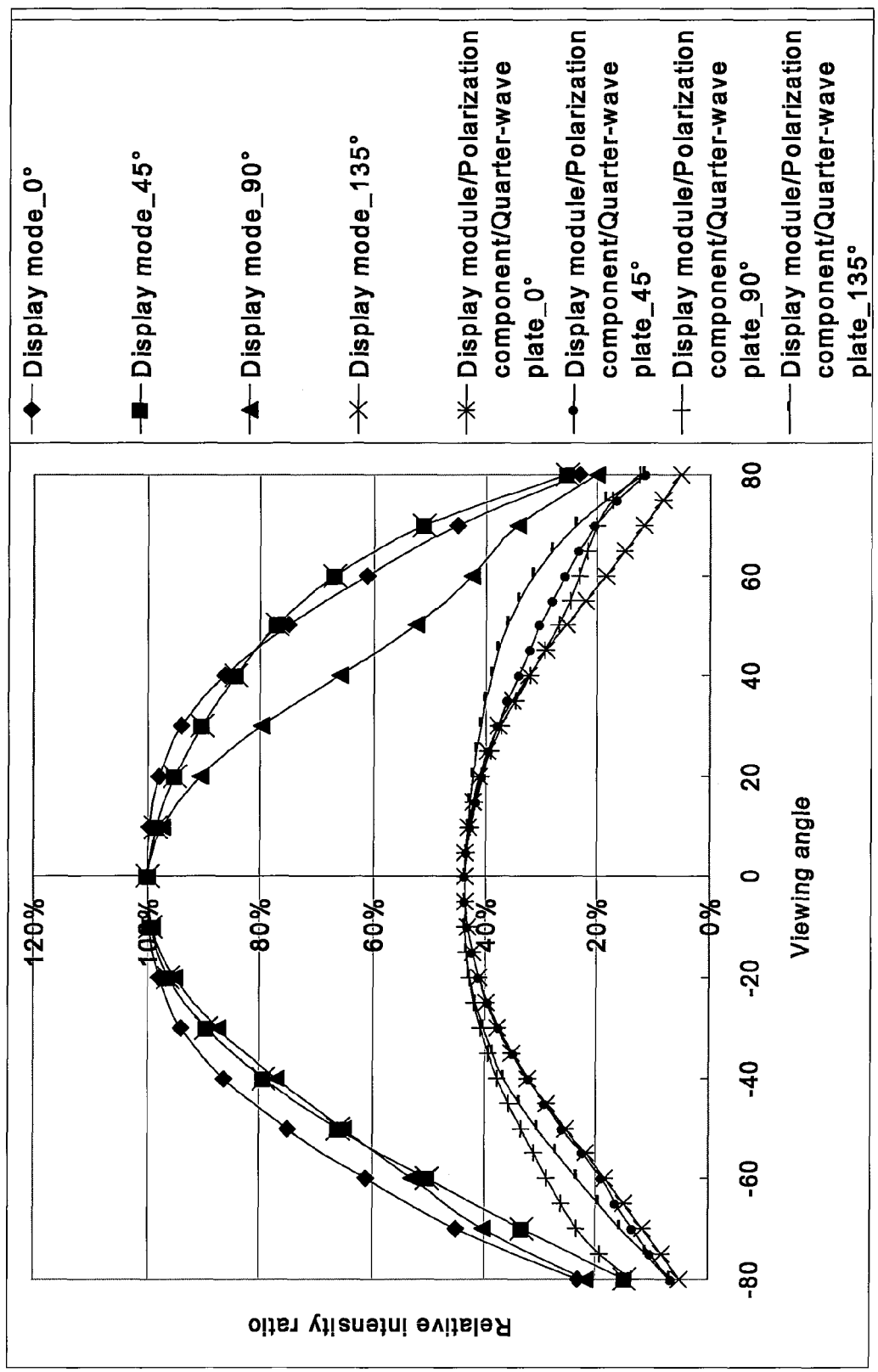

More specifically, the biaxial half-wave plate 240 provides a plate retardation Rth and a planar retardation Ro in a thickness direction of the biaxial half-wave plate 240. A designer can modulate the polarization of a displayed image by selecting various plate retardations Rth and planar retardations Ro. Thus, the quantity of the displayed image of the display module 220 passing through the polarization component 210 is enhanced. The planar retardation Ro of the biaxial half-wave plate 240 is between about 250 nm and about 300 nm. FIG. 5A and FIG. 5C illustrate the brightness of a conventional display apparatus viewed through the polarization component from various horizontal viewing angles and FIG. 5B and FIG. 5D illustrate the brightness of a display apparatus of the present invention viewed through the polarization component with various horizontal viewing angles. Specifically, FIGS. 5A and 5B illustrate the brightness of a conventional display apparatus and a display apparatus of the present invention viewed through a polarization component from various horizontal viewing angles, respectively. FIGS. 5C and 5D illustrate the relative intensity ratio of a conventional display apparatus and a display apparatus of the present invention viewed through a polarization component from various horizontal viewing angles, respectively. Generally, the ratio of the plate retardation Rth to the planar retardation Ro is defined as Nz. Referring to FIG. 5A, a quarter-wave plate 160 (shown in FIG. 2) is disposed between a polarizer 120 (shown in FIG. 2A) and a polarization component 150 (shown in FIG. 2A) according to prior art. It can be known from actual measurement results that the largest relative brightness viewed by the user through the polarization component 150 (shown in FIG. 2A) is about 0.05. On the other hand, Referring to FIG. 5B, the planar retardation Ro of the biaxial half-wave plate 240 adopted by the present embodiment is about 250 nm, and Nz is about 0.8. It can be known from actual measurement results that the largest relative brightness viewed by the user through the polarization component 210 (shown in FIG. 3) is approximately increased to 0.08. Similarly, it can be known from simulation results in FIG. 5C that the largest relative intensity ratio viewed by the user through the polarization component 150 (shown in FIG. 2A) is about 45%. Additionally, it can be known from simulation results in FIG. 5D that the largest relative intensity ratio viewed by the user through the polarization component 210 (shown in FIG. 3) is approximately increased to 70%. Therefore, when the user views the display apparatus 200 through the polarization component 210, the biaxial half-wave plate 240 used in the present invention prevents the displayed brightness viewed by the user from decreasing significantly.

Figure 6:
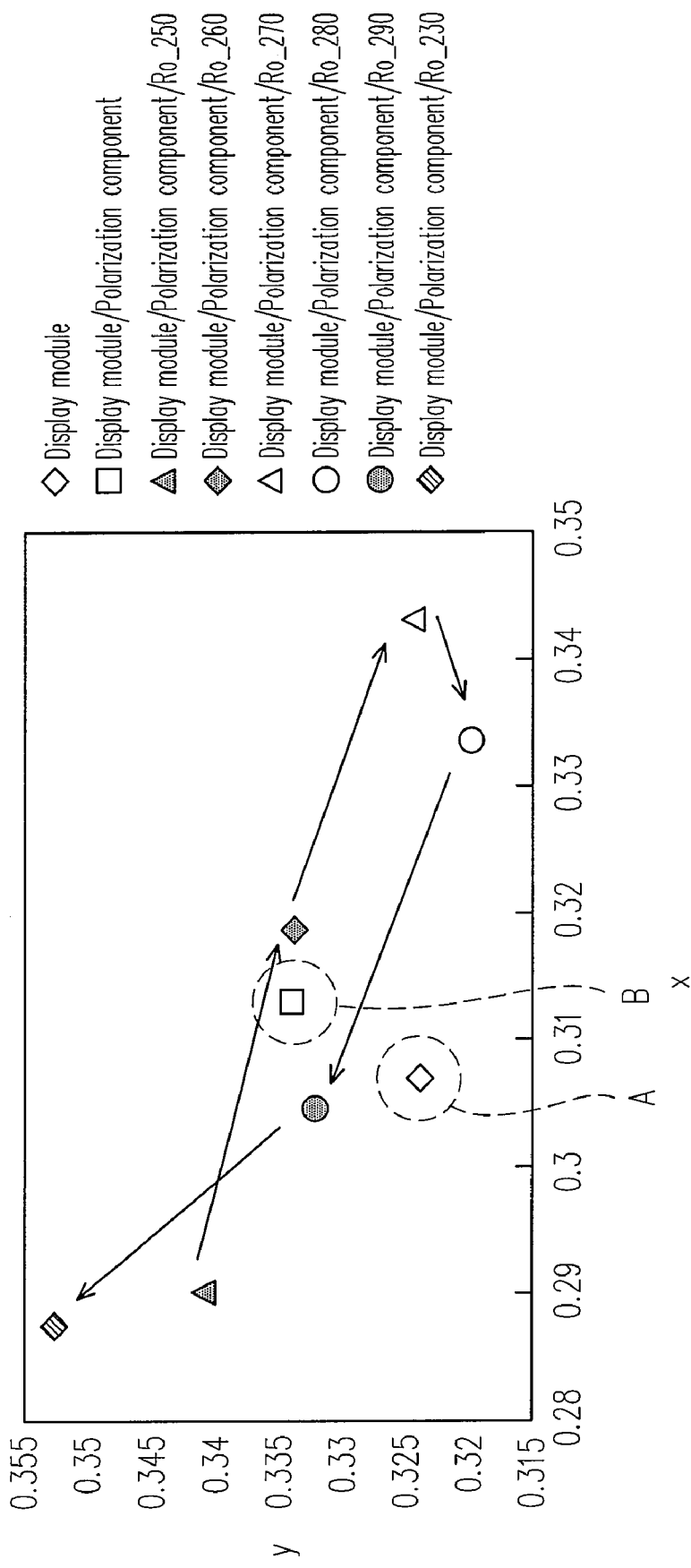
FIG. 6 is a chromaticity diagram of a display apparatus of the present invention having the biaxial half-wave plate with various planar retardations.

Not only the requirement of the brightness of the displayed image observed by the user through the polarization component 210, but also the requirement of color saturation of the displayed image can be enhanced by changing the planar retardation Ro of the biaxial half-wave plate 240. FIG. 6 is an chromaticity diagram of a display apparatus of the present invention having biaxial half-wave plates with various planar retardations. Referring to FIG. 6, a point A represents an original color expression of the display module 220 on the chromaticity diagram, and a point B represents a color expression of an image on the display module 220 viewed by the user through the polarization component 210. It can be know from the relative positions of the points A and B that the displayed image viewed through the polarization component 210 by the user becomes to yellowish. Referring to FIG. 6, the present embodiment makes the displayed image viewed by the user through the polarization component 210 have different color expressions on the chromaticity diagram by changing the planar retardation Ro of the biaxial half-wave plate 240. As shown in FIG. 6, the color expression of the display module 220 would have remarkable differences on the chromaticity diagram by changing the planar retardation Ro of the biaxial half-wave plate 240 from about 250 nm to about 300 nm. Therefore, the designer can properly select biaxial half-wave plates 240 with different planar retardations Ro to meet the requirements of the displayed color so as to mitigate the problem of yellowish displayed images, and thereby enhancing the display quality.

As for the requirement for the image displayed on the display apparatus 200 viewed by the user through the polarization component 210, besides taking the brightness and color saturation into consideration, the designer may also optimize the brightness distribution of the displayed image by fine-tuning the plate retardation Rth of the biaxial half-wave plate 240, so that the image displayed on the display apparatus 200 has uniform brightness. Specifically, when Nz (the ratio of the plate retardation Rth to the planar retardation Ro) falls in a specific range, the brightness distribution of the displayed image can be rendered even more uniform. In an embodiment of the present invention, when Nz is smaller than 1.4, the displayed image has better uniformity in brightness distribution.

Figure 7:
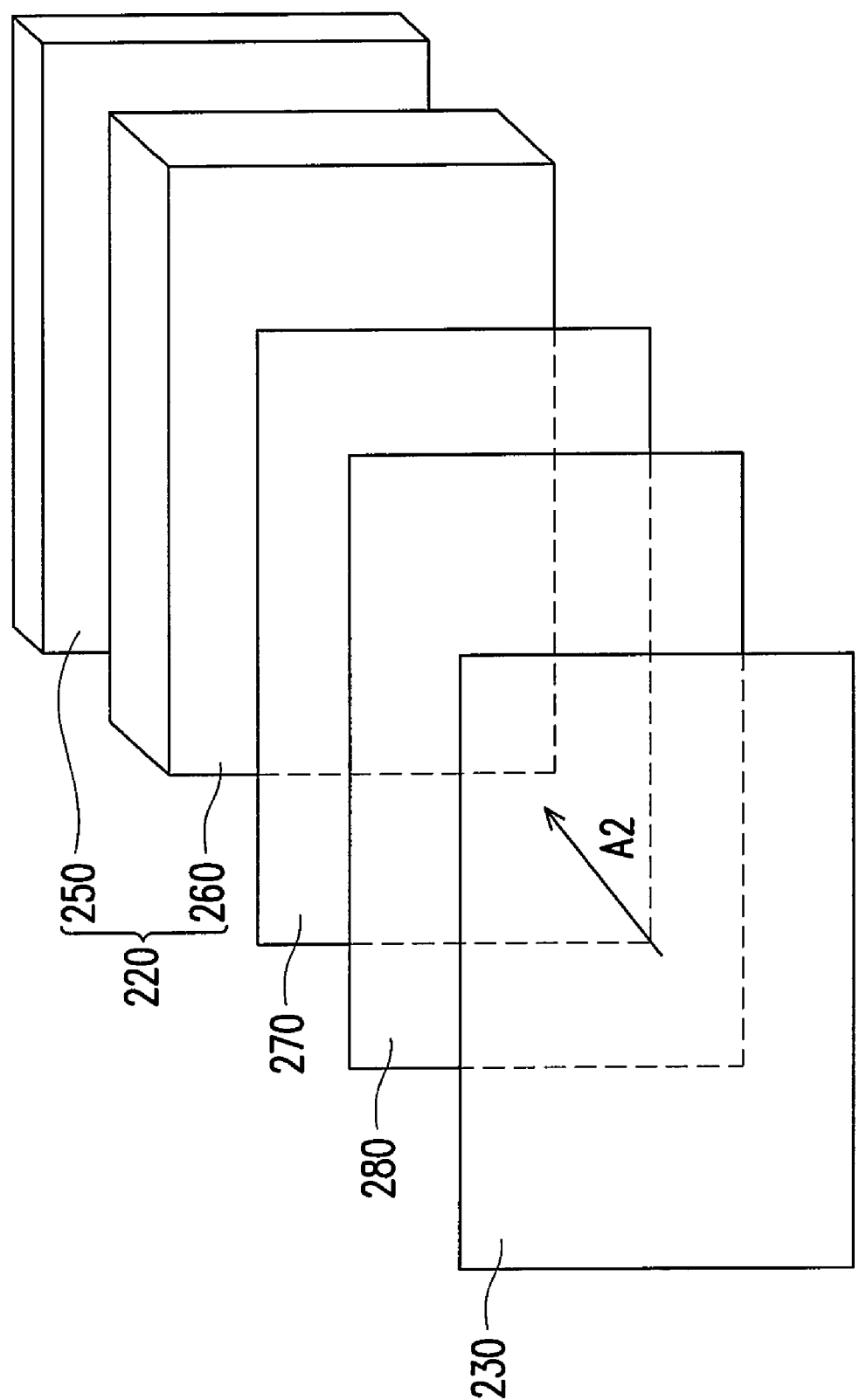
FIG. 7 is a schematic view illustrating a display module of the present invention.

FIG. 7 is a schematic view of a display module of the present invention. Referring to FIG. 7, the display module 220 is an LCD module, for example. The display module 220 includes a back-light source 250 and an LCD panel 260. The LCD panel 260 is disposed on the back-light source 250. The application field of the present invention is wide. For example, the display module 220 can be a non-self-illuminating display module, e.g. a reflective LCD module or a transflective LCD module. It can also be, for example, a self-illuminating display module, e.g. an organic light-emitting diode (OLED) display. In the present embodiment, the non-self-illuminating display module is taken as an example.

Referring to FIG. 7, to enhance the display quality of the display module 220, the display module 220 can further include a viewing angle compensation film, such as a quarter-wave plate 270 or a combination of the quarter-wave plate 270 and a half-wave plate 280. Certainly, the viewing angle compensation film may be the quarter-wave plate 270 only or other types of compensation films. It should be noted that, according to other embodiments, in the display module 220, other types of optical compensation films can also be attached to the LCD panel 260, such as a wide-viewing angle film, so as to further enhance the display quality of the display module 220.

Figure 8:
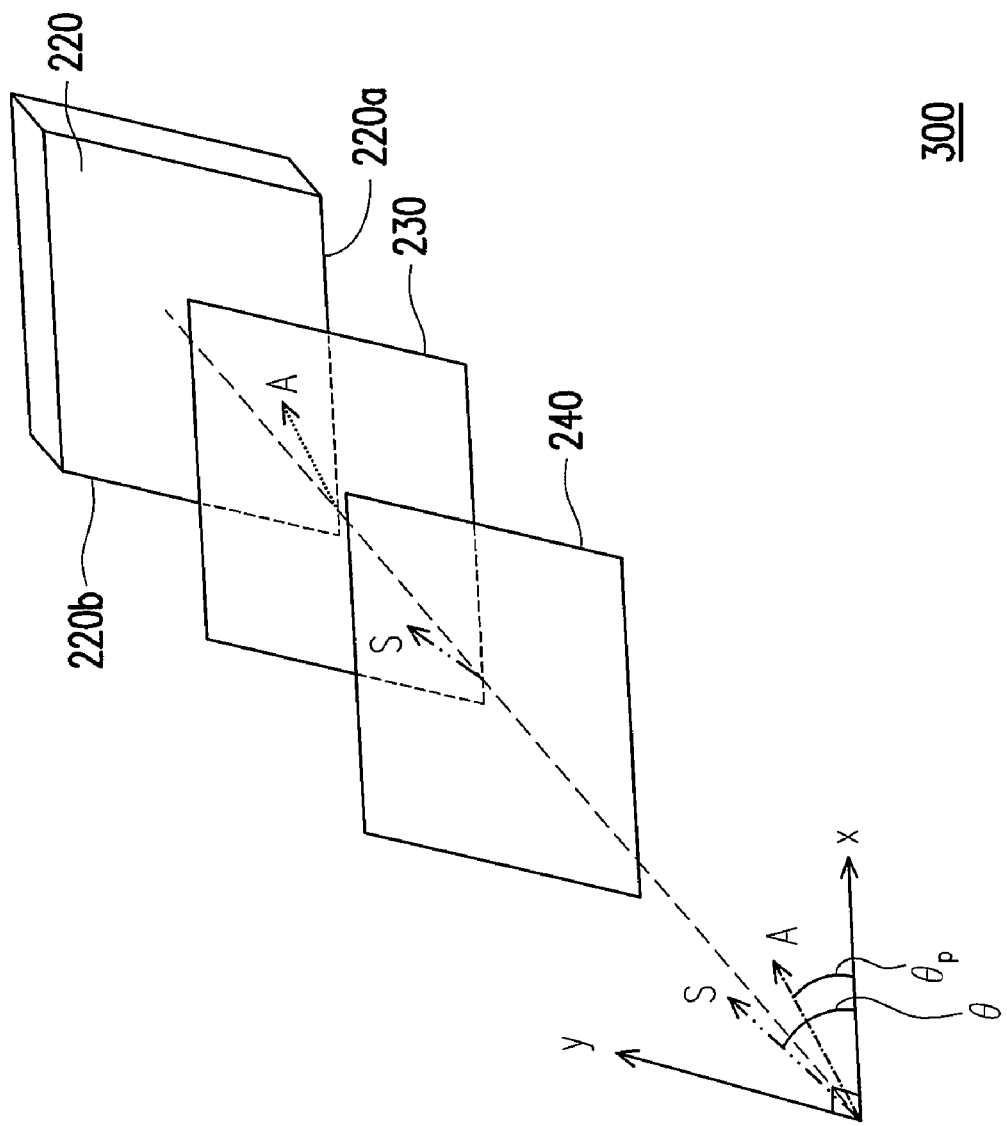
FIG. 8 is a schematic view illustrating a display apparatus of the present invention.

FIG. 8 is a schematic view illustrating a display apparatus of the present invention. Referring to FIG. 8, a display apparatus 300 includes a display module 220, a polarizer 230 and a biaxial half-wave plate 240. The display module 220 has a long edge 220a and a short edge 220b. In the present embodiment, the X axis in the coordinate graph is defined as paralleling with the long edge 220a of the display module 220, and the Y axis in the coordinate graph is defined as paralleling with the short edge 220b of the display module 220. As shown in FIG. 8, the polarizer 230 is disposed on the display module 220. The polarizer 230 has a transmittance axis A, and an included angle $\theta_p$ is formed between the transmittance axis A and the long edge 220a such that a light from the display module 220 passes through the polarizer 230 and is converted into a polarized light. It should be noted that the included angle $\theta_p$ between the transmittance axis A of the polarizer 230 and the long edge 220a in the present embodiment is similar to the included angle $\theta_2$ between the second transmittance axis and the long edge 220a in FIG. 3. Referring to FIG. 8, the biaxial half-wave plate 240 is disposed on the display module 220. The biaxial half-wave plate 240 has a slow axis S, and an included angle $\theta$ is formed between the slow axis S and the long edge 220a. The transmittance axis A and the slow axis S satisfy a formula: $|\theta_p|<|\theta|<90°$. Since the biaxial half-wave plate 240 has a function of modulating the polarization of the polarized light, the displayed image provided the display module 220 through the biaxial half-wave plate 240 tends to a polarization in parallel to the short edge 220b.

Figure 9:
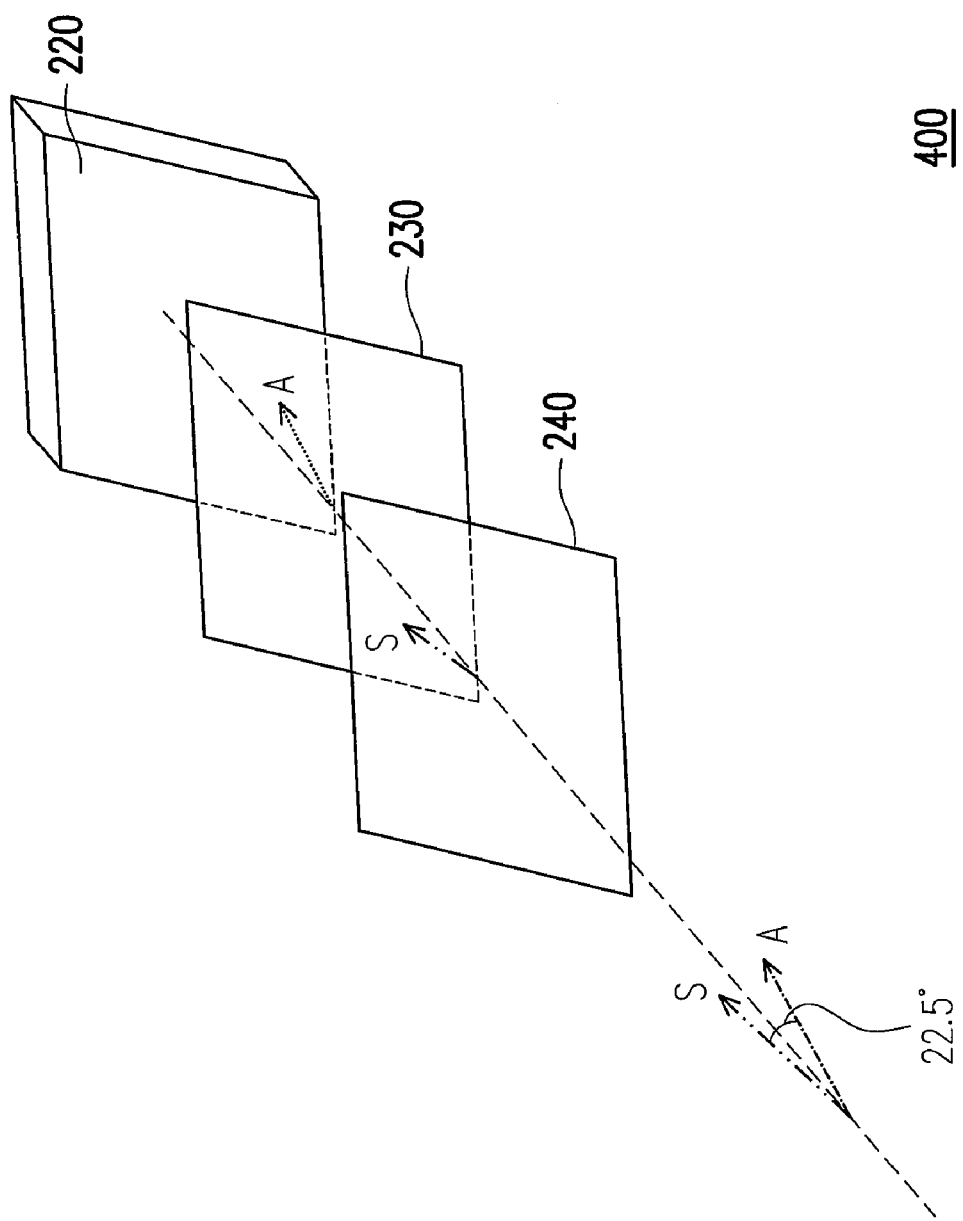
FIG. 9 is a schematic view illustrating a display apparatus of the present invention.

FIG. 9 is a schematic view illustrating a display apparatus of the present invention. Referring to FIG. 9, a display apparatus 400 includes a display module 220, a polarizer 230 and a biaxial half-wave plate 240. The polarizer 230 is disposed on the display module 220. The polarizer 230 has a transmittance axis A such that the light from the display module 220 passes through the polarizer 230 and is converted into a polarized light. The biaxial half-wave plate 240 is disposed on the polarizer 230. The biaxial half-wave plate 240 has a slow axis S, and an included angle formed between the transmittance axis A and the slow axis S is larger than about 0° and smaller than about 45°. For example, in the present embodiment, the included angle formed between the transmittance axis A and the slow axis S is about 22.5°. The biaxial half-wave plate 240 has a function of modulating the polarization of the polarized light to allow the polarized light through the transmittance axis A to tend to the direction of the slow axis S of the biaxial half-wave plate 240. Furthermore, the display module 220 is a reflective LCD module 220 or a transflective LCD module 220, for example. In addition, to enhance the display quality of the display module 220, the display module 220 can further include a viewing angle compensation film. The viewing angle compensation film is, for example, a quarter-wave plate 270 or a combination of the quarter-wave plate 270 and a half-wave plate 280. In other embodiments, the display module 220 can also include a wide-viewing angle film disposed on the LCD panel 260.

The present invention properly modulates the polarization of the image displayed on the display module through the biaxial half-wave plate to meet the requirement of various applications. Meanwhile, the display quality of the displayed image can be further enhanced by fine-tuning the retardation of the biaxial half-wave plate. In addition, in one embodiment, the polarization of the image modulated through the biaxial half-wave plate tends to the direction of the transmittance axis of the polarization component worn by the user. Therefore, in comparison with the prior art, the display apparatus of the present invention increases the brightness and decreases the dependency on the included angle between optical axes.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display apparatus suitable for a user to view through a polarization component having a first transmittance axis, comprising:
    a display module;
    a polarizer disposed on the display module, wherein the polarizer has a second transmittance axis such that a light from the display module passes through the polarizer and is converted into a polarized light; and
    a biaxial half-wave plate disposed on the display module and between the polarizer and the polarization component, wherein the biaxial half-wave plate has a slow axis arranged between the first and second transmittance axes, and the polarized light has a polarization passing through the biaxial half-wave plate and tending toward the first transmittance axis, and the biaxial half-wave plate provides a plate retardation Rth and a planar retardation Ro in a thickness direction of the biaxial half-wave plate, wherein the planar retardation Ro satisfies 250 nm≦Ro≦300 nm.

2. The display apparatus of claim 1, wherein the display module comprises a reflective liquid crystal display (LCD) module or a transflective LCD module.

3. The display apparatus of claim 1, wherein the display module comprises a light source and an LCD panel disposed on the light source.

4. The display apparatus of claim 3, wherein the display module further comprises a viewing angle compensation film or a wide-viewing angle film disposed on the LCD panel.

5. The display apparatus of claim 4, wherein the viewing angle compensation film comprises a quarter-wave plate or a combination of the quarter-wave plate and a half-wave plate.

6. The display apparatus of claim 1, wherein the display module comprises a self-illuminating display panel.

7. The display apparatus of claim 1, wherein the display module has a long edge and a short edge.

8. The display apparatus of claim 7, wherein an included angle between the first transmittance axis and the long edge is $\theta_1$, an included angle between the slow axis and the long edge is $\theta$, and an included angle between the second transmittance axis and the long edge is $\theta_2$, $\theta$ is between $\theta_1$ and $\theta_2$.

9. The display apparatus of claim 8, wherein the angle $\theta_2$ between the second transmittance axis and the long edge is 45°.

10. The display apparatus of claim 9, wherein the angle $\theta_1$ between the first transmittance axis and the long edge is 90°.

11. The display apparatus of claim 9, wherein the angle $\theta_1$ between the first transmittance axis and the long edge is 0°.

12. The display apparatus of claim 1, wherein an Nz value satisfies Nz=Rth/Ro<1.4.

13. A display apparatus, comprising:

a display module having a long edge and a short edge;

a polarizer disposed on the display module, wherein the polarizer has a transmittance axis, and an included angle $\theta_p$ is formed between the transmittance axis and the long edge such that the a light from the display module passes through the polarizer and is converted into a polarized light; and a biaxial half-wave plate disposed on the display module, wherein the biaxial half-wave plate has a slow axis, and an included angle $\theta$ is formed between the slow axis and the long edge such that a polarization of the polarized light passing through the biaxial half-wave plate tends to be parallel with the short edge, and the transmittance axis and the slow axis satisfy $|\theta_p|<|\theta|<90°$.

14. A display apparatus suitable for a user to view through a polarization component having a first transmittance axis, comprising:

a display module;

a polarizer disposed on the display module, wherein the polarizer has a second transmittance axis such that a light from the display module passes through the polarizer and is converted into a polarized light; and a biaxial half-wave plate disposed on the display module and between the polarizer and the polarization component, wherein the biaxial half-wave plate has a slow axis arranged between the first and second transmittance axes, and the polarized light has a polarization passing through the biaxial half-wave plate and tending toward the first transmittance axis, and the biaxial half-wave plate provides a plate retardation Rth and a planar retardation Ro in a thickness direction of the biaxial half-wave plate, wherein an Nz value satisfies Nz=Rth/Ro<1.4.

* * * * *